United States Patent
Schmidt et al.

(10) Patent No.: US 6,422,631 B1
(45) Date of Patent: Jul. 23, 2002

(54) MOTOR VEHICLE HAVING A VEHICLE SEAT

(75) Inventors: Bernd Schmidt, Wildberg; Ralf-Henning Schrom, Rottenburg; Volkmar Schulz, Weitransdorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/520,975

(22) Filed: Mar. 8, 2000

(30) Foreign Application Priority Data

Mar. 8, 1999 (DE) .......................... 199 10 086

(51) Int. Cl.⁷ ................................ B60N 2/02
(52) U.S. Cl. ................. 296/68.1; 296/204; 296/188; 296/65.13
(58) Field of Search ................ 296/68.1, 204, 296/188, 189, 203.03, 209, 65.13

(56) References Cited

U.S. PATENT DOCUMENTS

| | | | | |
|---|---|---|---|---|
| 4,804,226 A | * | 2/1989 | Schmale | 297/216 |
| 5,584,525 A | * | 12/1996 | Nakano et al. | 296/68.1 |
| 5,984,402 A | * | 11/1999 | Iakeuchi | 296/188 |
| 6,050,629 A | * | 4/2000 | Bernhardt et al. | 296/68.1 |
| 6,073,992 A | * | 6/2000 | Yamauchi et al. | 296/188 |
| 6,129,412 A | * | 10/2000 | Tanima | 296/204 |
| 6,227,596 B1 | * | 5/2001 | Foucault et al. | 296/65.13 |

FOREIGN PATENT DOCUMENTS

| | | | |
|---|---|---|---|
| DE | 27 47 584 | * | 4/1979 |
| DE | GM 79 32 187 | | 2/1980 |
| DE | 29 16 562 | * | 10/1980 |
| DE | 41 02 353 A1 | | 7/1992 |
| DE | 197 09 314 A1 | | 7/1997 |
| EP | 0 046 227 B1 | | 2/1985 |
| GB | 2 087 803 A | | 6/1982 |

* cited by examiner

Primary Examiner—Ken Patel
(74) Attorney, Agent, or Firm—Crowell & Moring, LLP

(57) ABSTRACT

A motor vehicle has at least one vehicle occupant seat arranged laterally of a side member. The vehicle occupant seat is arranged on seat rails which extend in the longitudinal direction of the motor vehicle and are fixedly connected by way of a seat underframe with a vehicle floor. The side member and the seat rail adjoining the side member have mutually assigned safety devices which are arranged at a distance from one another in the longitudinal direction of the motor vehicle. The safety devices can be brought into an operative connection with one another such that the seat rail and the side member are connected by way of the safety devices during high dynamic stressing of the vehicle occupant seat and/or of the side member.

12 Claims, 2 Drawing Sheets

MOTOR VEHICLE HAVING A VEHICLE SEAT

This application claims the priority of German application 199 10 086.1, filed Mar. 8, 1999, the disclosure of which is expressly incorporated by reference herein.

BACKGROUND AND SUMMARY OF THE INVENTION

The present invention relates to a motor vehicle having at least one vehicle occupant seat arranged laterally of a side member. Seat rails, on which the seat is arranged, extend in the longitudinal direction of the vehicle and are fixedly connected by way of an underframe with a vehicle floor.

Vehicle seats of motor vehicles are known to have various constructions. The seats are usually displaceably arranged on longitudinal rails which are mounted on a seat underframe. For adjustment and locking of a seat into position, as a rule, diverse connecting and locking devices are provided.

German Patent Document DE-GM 79 32 187, for example, describes a cross member for an occupant seat in a vehicle which is connected with a seat rail and to which the frame of a foldable seat is linked. In its normal position, this frame can be locked by a locking device. This locking device has a hook-shaped element for fixing the vehicle occupant seat in its normal position. The element is fastened on the tiltable frame of the vehicle seat. In order to be able to tilt the vehicle occupant seat, a device is provided for operating the hook-shaped element in order to open up the locking arrangement.

This construction has a disadvantage in that, in the event of a frontal or rear impact (in the event of a crash), the seat rail may release from its holding device. Alternatively, a side member of the motor vehicle may buckle. Consequently, a vehicle occupant may be injured because of the resulting movement of the vehicle occupant seat or because of a reduction in the size of the vehicle occupant interior.

European Patent Document EP 0 046 227 describes a system in a motor vehicle which has short bolts connected with the vehicle door. When the vehicle door is closed, the bolts engage in a device which is fixedly connected with the seat rail. As a result, a connection is established between the vehicle door and the seat rail in order to avoid a relative sliding movement between the door and the rail. In the event of a crash, this connection ensures a secure distance between the vehicle door and the vehicle occupant seat.

This system, however, has a disadvantage in that, in the event of high dynamic stressing of the vehicle occupant seat, the seat rail may release from its fastening with the vehicle and a vehicle occupant sitting in this seat may be injured. It is also disadvantageous that a side member is insufficiently secured with respect to deformation by buckling in the event of a frontal or rear impact.

From German Patent Document DE 41 02 353 A1, a passenger car is known in which each of the front seats is displaceable on interior and exterior mutually spaced seat rails. The passenger car has door side members made of extruded light-metal profiles to which forward and rearward support bearings for the exterior seat rail is welded. In order to obtain an additional and lasting form-locking connection, the support bearings have an upward-projecting edge which engages in a downwardly open longitudinal groove of the extruded profile of the door side member. The purpose of this connection is to ensure that, in the event of a front impact or a rear impact, the seat rail cannot detach from the side member even if the welded connection of the support bearing with the interior wall of the side member breaks.

However, this structure is disadvantageous in that the additional form-locking connection requires high manufacturing expenditures and has high production costs.

It is therefore an object of the present invention to provide a motor vehicle, particularly a passenger car, having at least one vehicle occupant seat by which, when the motor vehicle is involved in an accident, the greatest possible safety exists. In particular, deformation, as a result of longitudinal deformation of a side member, can be avoided in the event of a frontal and/or rear impact.

The safety devices according to the invention are arranged at a distance from one another in the longitudinal direction. These safety devices, therefore, establish an at least approximately form-locking connection with one another only when a relative movement occurs between the seat rail and the side member.

According to the invention, it is an advantage that no special tolerances have to be observed during manufacturing. Also, in normal operation of the motor vehicle, noises caused by one of the two safety devices hitting or rubbing against the other are avoided.

The two safety devices according to the invention can advantageously be brought into an operative connection with one another such that, as a result of the connection between the safety devices occurring in the event of a frontal and/or rear impact, an extremely strong coupling of the seat rail and the side member is formed. As a result, an additional connection is implemented between the seat rail, the side member and the vehicle floor, so that an effective stiffening of the vehicle body of the motor vehicle is achieved and deformation of the side member by buckling is avoided. This is particularly advantageous in a coupe, in which the stiffness of the vehicle body is essentially determined by the floor assembly.

Advantageous further developments of the invention are reflected in the claims and are present in the embodiments described in the following and shown in the drawings.

DESCRIPTION OF THE PREFERRED EMBODIMENTS

Figure 1:
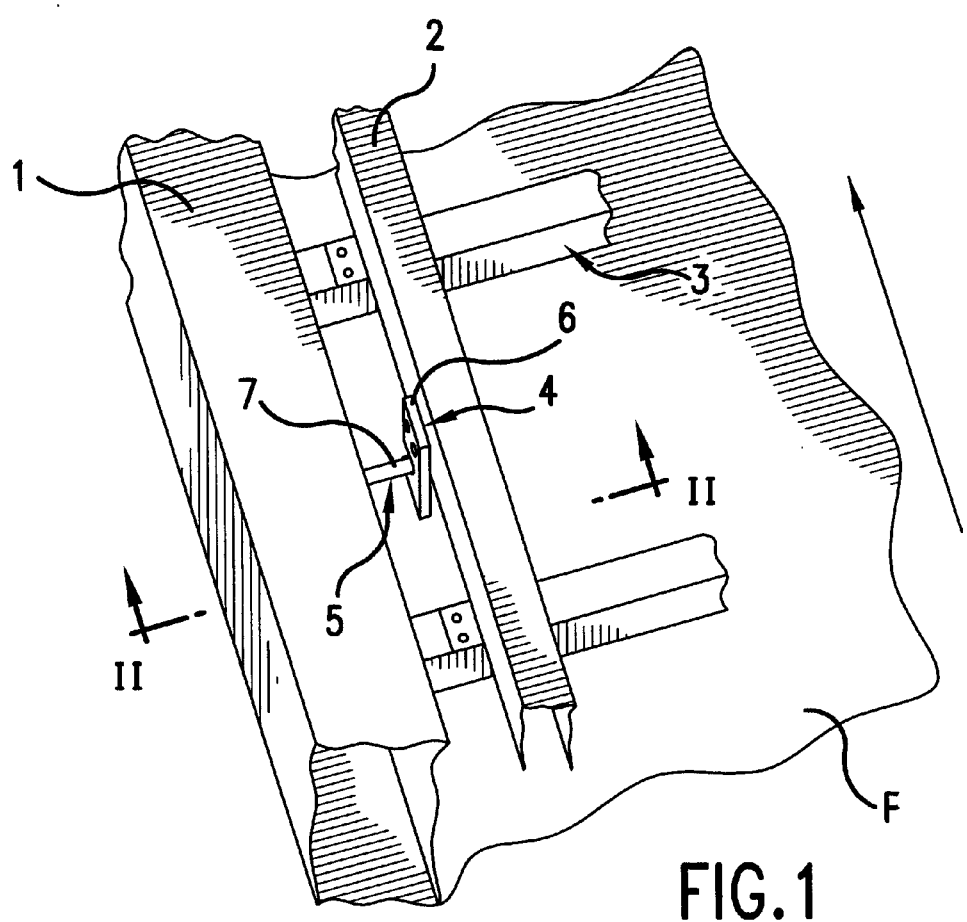
FIG. 1 is a very schematic three-dimensional representation of a side member and a seat rail of a motor vehicle, each of which has a safety device.

FIG. 1 is a very schematic three-dimensional representation of a side member 1 of a motor vehicle and a seat rail 2 adjoining the side member 1. On a seat underframe 3, the seat rail 2 is fixedly connected with a vehicle floor F of the motor vehicle, which is shown schematically in FIG. 1. The seat rail, moreover, extends in the longitudinal direction of the motor vehicle. The seat rail 2 is provided with another parallel seat rail 2 for receiving a vehicle occupant seat S (shown partially and schematically in FIG. 2) which, in the installed position, is displaceably disposed on the two seat rails 2.

One safety device 4, 5, respectively, is provided on the side member 1 and on the seat rail 2 illustrated in FIG. 1. The safety devices 4, 5 are arranged at a distance from one another in the longitudinal direction of the motor vehicle and can be brought into an operative connection with one another such that, by way of the safety devices 4, 5, in the event of high dynamic stressing of the vehicle occupant seat and/or of the side member 1, a connection is established between the side member 1 and the seat rail 2.

High dynamic stress can be caused, for example, by a rear and/or frontal impact (crash) of the motor vehicle and can result in a relative movement between the seat rail 2 and the side member 1. The safety device 4 of the seat rail 2 and the safety device 5 of the side member 1 are caused to rest against one another by this relative movement.

In the present embodiment, the safety device 4 of the seat rail 2 has a hook-shaped catch plate 6 which is provided with a recess and is welded to the seat rail 2. The safety device 5 of the side member 1 has a bolt or pin 7 which is welded to the side member 1 and, in the installed position, is arranged in the area of the recess of the hook-shaped catch plate 6 without touching it.

A crash can result in a deformation of the body of the motor vehicle as well as in a displacement of the seat rail 2 essentially in the longitudinal direction of the motor vehicle. In this case, the bolt 7 comes to rest approximately form-lockingly against the hook-shaped catch plate in the area of the recess.

Figures 2, 3:
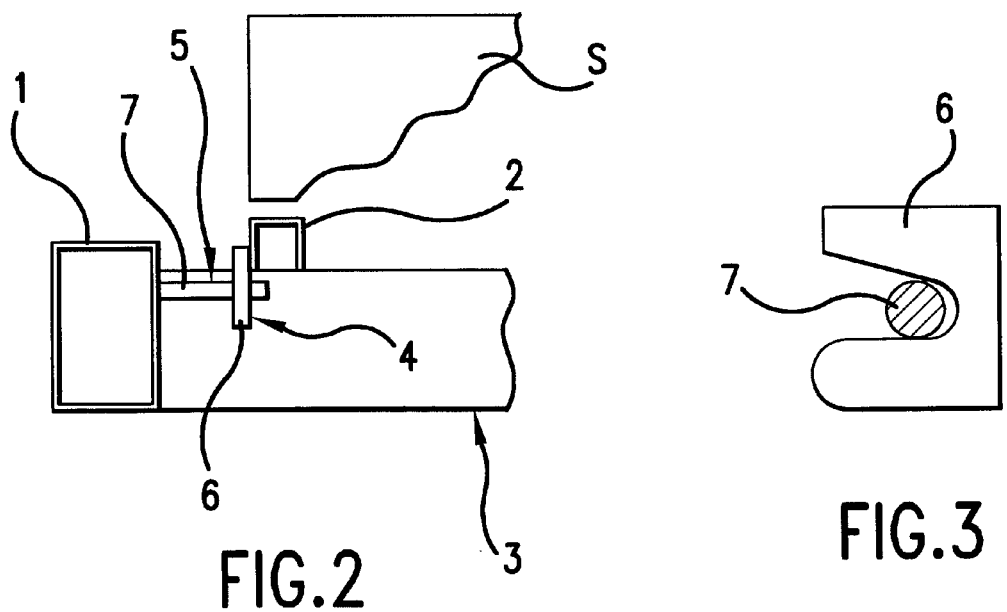
FIG. 2 is a sectional view of the side member and of the seat rail along line II—II of FIG. 1.
FIG. 3 is a view of a hook-shaped catch plate having a recess in which a bolt engages.

FIG. 2 is a sectional view of the side member 1 and of seat rails 2 along line II—II in FIG. 1. The length of the bolt 7 is provided such that it extends, starting from the side member 1, through the opening of the hook-shaped catch plate 6 and beyond the latter. This ensures that the connection between the left side seat rail 2 of FIG. 2 and the side member 1, even when several deformations of the body of the motor vehicle are present, and thus of the floor of the motor vehicle as well as of the side member 1, is not opened up because the bolt slides out of engagement with the hook-shaped catch plate 6.

In the forward driving direction of the motor vehicle, which is indicated by an arrow in FIG. 1, the bolt 7 is arranged in front of the hook-shaped catch plate 6, so that movement of the seat rail 2 in the forward driving direction is blocked. As a result, in the event of a crash, displacement of the vehicle occupant seat and resulting possible injuries to vehicle occupants are avoided.

Furthermore, the side member 1 is supported in the vertical direction by way of the bolt 7 and the hook-shaped catch plate 6 of the seat rail 2, which has a high resistance to bending. Thus, a deformation of the side member 1, such as a buckling in the event of a crash, is counteracted by the additional supporting and stiffening of the vehicle body.

FIG. 3 is a lateral view of the hook-shaped catch plate 6, the bolt 7 being arranged in the recess without touching the hook-shaped catch plate 6. The further development of the safety device 4 of the seat rail 2 with the hook-shaped catch plate 6 and of the safety device 5 of the side member 1 with the bolt 7, during manufacturing and during assembly, permits high manufacturing tolerances. The manufacturing and mounting costs are reduced as a result. Furthermore, used cars can also be retrofitted with this safety concept.

Figure 4:
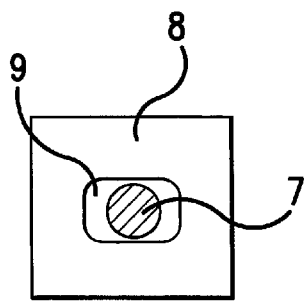
FIG. 4 is a view of the catch plate having a recess in which a bolt is arranged.

FIG. 4 illustrates a catch plate 8 with an opening 9 in which the bolt 7 engages. Instead of the hook-shaped catch plate 7, the catch plate 8 can be fastened on the seat rail 2, in which case a movement of the seat rail 2 is limited not only in the forward driving direction of the motor vehicle but also in the opposite direction with respect to the side member 1. Also, in this case, the bolt 7 and the catch plate 8 are arranged at a distance from one another in the normal installed position before a crash.

Figure 5:
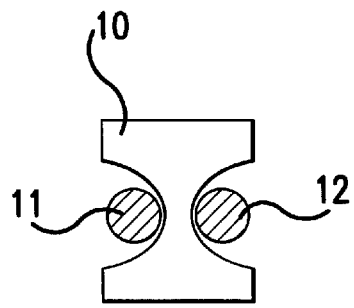
FIG. 5 is a view of a double-hook-shaped catch plate having recesses on its front sides and showing one bolt respectively engaging in each recess.

FIG. 5 illustrates another double-hook-shaped catch plate 10 of the safety device 4 of the seat rail 2. The catch plate 10 has a recess on each of its front sides. A first bolt 11, which is arranged in the longitudinal direction of the motor vehicle in front of the double-hook-shaped catch plate 10, engages in one recess, while a second bolt 12 of the safety device 5 of the side member 1, which is arranged in the longitudinal direction of the vehicle behind the catch plate 10, is arranged in the other recess. This arrangement limits movement of the seat rail 2 with respect to the side member 1 in the forward driving direction as well as in the reversing direction of the motor vehicle.

Furthermore, in each of the embodiments of FIGS. 4 and 5, the side member 1 is supported in the vertical direction in the event of a crash by the seat rail 2. Stiffening of the body of the motor vehicle increases passive safety.

Naturally, it is up to the person skilled in the art to fasten the above-described further developments of the safety device 4 of the seat rail 2 on the side member 1 and to provide the further developments of the safety device 5 of the side member 1 on the seat rail 2.

Figure 6:
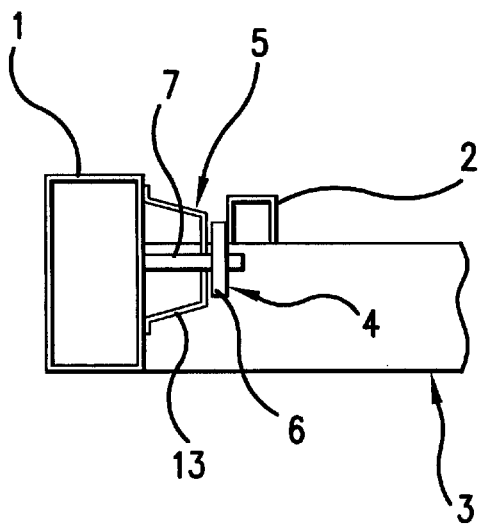
FIG. 6 is a view of a side member having a crash console arranged thereon which is connected with a bolt engaging in a hook-shaped catch plate of a seat rail.

As illustrated in FIG. 6, the safety device 5 of the side member 1 may have a crash console 13 which is connected with the side member 1 and the bolt 7. The bolt 7 has a length which extends beyond the crash console 13 so that it engages in the recess of the hook-shaped catch plate 6.

The bolt 7 is connected with the side member 1 and, in the area in front of the engagement in the hook-shaped catch plate 6, is connected with the crash console 13. This ensures firm reception of the bolt 7 in the crash console 13.

The crash console 13 is constructed as a pocket-type punched bent part or hollow part and is welded to the side member 1 at least in sections.

By constructing the crash console 13 as a hollow part, the crash console has a high stability for transmitting forces between the seat rail 2 and the side member 1 transversely to the longitudinal axis of the motor vehicle and, therefore, provides side impact protection.

Figure 7:
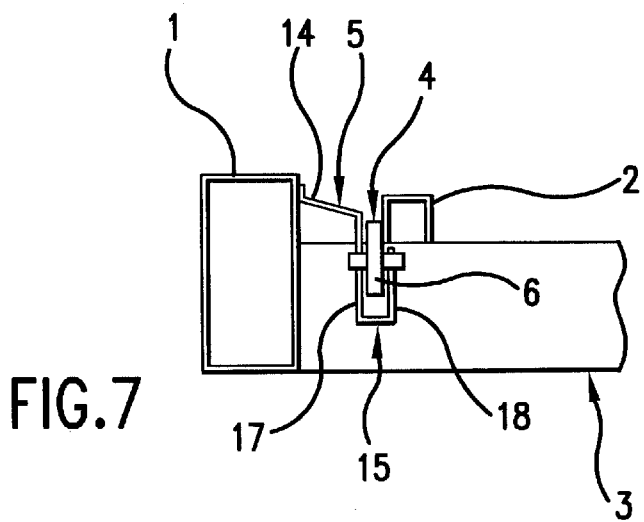
FIG. 7 is a view of a side member having a steel plate part which is arranged thereon and which has a U-shaped section.

The safety device 5 of the side member 1, as shown in FIG. 7, is provided with a steel plate part 14 which reaches under the hook-shaped catch plate 6 by way of an at least approximately U-shaped section 15. A sleeve 16 is arranged in the area of the recess of the hook-shaped catch plate 6. The sleeve is arranged so as to extend from a leg 17 of the U-shaped section 15 through the recess of the hook-shaped catch plate 6 to a second leg 18 of the section 15.

The sleeve 16 is welded to the two legs 17, 18 and, when the seat rail 2 is displaced in the forward driving direction with respect to the side member 1, engages in the hook-shaped catch plate 6. Consequently, a connection is established between the side member 1 and the seat rail 2 by way of the steel plate part 14. This increases the stiffening of the body of the motor vehicle and avoids deformation of the side member 1 in the event of a crash by the vertical support on the seat rail 2. In addition, in the event of an accident, by way of the steel plate part 14, forces transverse to the longitudinal direction of the vehicle are transmitted from the side member 1 to the seat rail 2. The steel plate part 14, therefore, is also suitable as a side impact protection device.

Furthermore, the bolts 7, 11, and 12, the catch plates 6, 8, and 10, the crash console 13 and the steel plate part 14, instead of being connected by welding with the side member 1 or the seat rail 2, may be connected with the side member 1 or the seat rail 2 by way of another connection suitable for the particular application. Such a connection may be a screwed connection.

In another embodiment, which differs from the present embodiments and which is not shown, the catch plates 6, 8, and 10 may be constructed in one piece with the seat rail 2 or the side member 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Motor vehicle comprising:
   at least one vehicle occupant seat,
   at least one seat rail on which the seat is arranged, said at least one seat rail extending in the longitudinal direction of the vehicle and being connected by way of an underframe with a vehicle floor,
   a side member adjoined by the at least one seat rail, and
   safety devices on the side member and the at least one seat rail adjoining the side member,
   wherein said safety devices are disposed at a distance from one another in the longitudinal direction of the motor vehicle but can cooperate with one another to connect the at least one seat rail and the side member as a result of high dynamic stressing of the vehicle occupant seat, the side member, or both the vehicle occupant seat and the side member.

2. Motor vehicle according to claim 1, wherein the safety devices can be connected to block a movement of the at least one seat rail in the longitudinal direction of the vehicle.

3. Motor vehicle according to claim 1, wherein the safety devices can be connected such that the side member is supported in the vertical direction by the at least one seat rail.

4. Motor vehicle according to claim 1, wherein one of the safety devices assigned to the at least one seat rail has a hook-shaped catch plate.

5. Motor vehicle according to claim 4, wherein another of the safety devices is assigned to the side member and has at least one bolt or pin.

6. Motor vehicle according to claim 5, wherein, during relative movement between the at least one seat rail and the side member, the bolt or pin engages at least approximately form-lockingly in a recess of the catch plate.

7. Motor vehicle according to claim 6, wherein the bolt or pin is arranged in front of the catch plate in the forward driving direction of the motor vehicle and, when the at least one seat rail is displaced with respect to the side member in the forward driving direction or when the side member is displaced with respect to the at least one seat rail in the reversing direction, engages in the recess of the catch plate.

8. Motor vehicle according to claim 1, wherein one of the safety devices assigned to the at least one of the seat rails is arranged at a distance with respect to another of the safety devices assigned to the side member in the longitudinal direction of the motor vehicle and at least partially reaches around the other of the safety devices.

9. Motor vehicle according to claim 1, wherein one of the safety devices assigned to the at least one of the seat rails has a double-hook-shaped catch plate with two recesses and another of the safety devices assigned to the side member has two bolts, and wherein, in the longitudinal direction of the vehicle, the double-hook-shaped catch plate is arranged between the bolts.

10. Motor vehicle according to claim 9, wherein one of said recesses is directed to a forward bolt of the two bolts and the other of said recesses is directed to a rearward bolt of the two bolts so that, in each case, one of the bolts, during relative movement in the longitudinal direction of the motor vehicle between the side member and the seat rail, engages in the recess facing it.

11. Motor vehicle according to claim 5, wherein the other of the safety devices assigned to the side member has a crash console which is connected with the side member and the at least one bolt or pin.

12. Motor vehicle according to claim 4, wherein another of the safety devices assigned to the side member has a steel plate part which reaches under the hook-shaped catch plate by way of a section which is at least approximately U-shaped and, in an area of a recess of the hook-shaped catch plate, is provided with a sleeve which extends from a first leg of the U-shaped section through the recess to a second leg of the U-shaped section.

* * * * *